(12) United States Patent
Lowrey et al.

(10) Patent No.: US 8,214,100 B2
(45) Date of Patent: *Jul. 3, 2012

(54) INTERNET-BASED SYSTEM FOR MONITORING VEHICLES

(75) Inventors: Larkin Hill Lowrey, La Jolla, CA (US);
Matthew J. Banet, Del Mar, CA (US);
Bruce Lightner, La Jolla, CA (US);
Diego Borrego, San Diego, CA (US);
Chuck Myers, La Jolla, CA (US)

(73) Assignee: HTI IP, L.L.C., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/783,488

(22) Filed: May 19, 2010

(65) Prior Publication Data
US 2010/0228429 A1    Sep. 9, 2010

(51) Int. Cl.
*G06F 19/00* (2011.01)
(52) U.S. Cl. ........................... 701/29.1; 340/989

(58) Field of Classification Search .............. 701/29–33, 701/35, 2, 3, 29.1–29.9; 340/989–993, 439
See application file for complete search history.

(56) References Cited

U.S. PATENT DOCUMENTS

| 5,729,452 | A | * | 3/1998 | Smith et al. | 701/29 |
| 5,941,918 | A | * | 8/1999 | Blosser | 701/29 |
| 6,636,790 | B1 | * | 10/2003 | Lightner et al. | 701/33 |
| 7,016,774 | B2 | * | 3/2006 | Barber et al. | 701/30 |

* cited by examiner

*Primary Examiner* — Dalena Tran
(74) *Attorney, Agent, or Firm* — John L. Doughty (57) ABSTRACT

The invention provides a method for monitoring a vehicle that features the steps of: 1) generating a data packet including vehicle data retrieved from the vehicle using a wireless appliance; 2) transmitting the data packet over an airlink with the wireless appliance so that the data packet passes through a network and to a host computer system; 3) processing the data packet with the host computer system to generate a set of data; and 4) displaying the set of data on a web page hosted on the internet.

14 Claims, 7 Drawing Sheets

INTERNET-BASED SYSTEM FOR MONITORING VEHICLES

CROSS REFERENCE TO RELATED APPLICATION

This application claims priority under 35 U.S.C. §120 to U.S. patent application Ser. No. 10/614,665, now U.S. Pat. No. 7,747,365, entitled 'Internet-based system for monitoring vehicles', which has a filing date of Jul. 7, 2003, and which is incorporated by reference in its entirety herein. This application also claims priority under 35 U.S.C. §120 to U.S. patent application Ser. No. 11/796,372, now U.S. Pat. No. 7,904,219, entitled 'Peripheral Access Devices and Sensors for Use with Vehicle Telematics Devices and Systems', which has a filing date of Apr. 27, 2007.

FIELD OF THE INVENTION

The present invention relates to use of an Internet-based system for monitoring a vehicle's performance.

BACKGROUND OF THE INVENTION

The Environmental Protection Agency (EPA) requires vehicle manufacturers to install on-board diagnostics (OBD-II) for monitoring light-duty automobiles and trucks beginning with model year 1996. OBD-II systems (e.g., microcontrollers and sensors) monitor the vehicle's electrical and mechanical systems and generate data that are processed by a vehicle's engine control unit (ECU) to detect any malfunction or deterioration in the vehicle's performance. Most ECUs transmit status and diagnostic information over a shared, standardized electronic buss in the vehicle. The buss effectively functions as an on-board computer network with many processors, each of which transmits and receives data. The primary computers in this network are the vehicle's electronic-control module (ECM) and power-control module (PCM). The ECM typically monitors engine functions (e.g., the cruise-control module, spark controller, exhaust/gas recirculator), while the PCM monitors the vehicle's power train (e.g., its engine, transmission, and braking systems). Data available from the ECM and PCM include vehicle speed, fuel level, engine temperature, and intake manifold pressure. In addition, in response to input data, the ECU also generates 5-digit 'diagnostic trouble codes' (DTCs) that indicate a specific problem with the vehicle. The presence of a DTC in the memory of a vehicle's ECU typically results in illumination of the 'Service Engine Soon' light present the dashboard of most vehicles.

Data from the above-mentioned systems are made available through a standardized, serial 16-cavity connector referred to herein as an 'OBD-II connector'. The OBD-II connector typically lies underneath the vehicle's dashboard. When a vehicle is serviced, data from the standardized buss is typically queried using an external engine-diagnostic tool (commonly called a 'scan tool') that connects to the OBD-II connector. The data are then displayed an analyzed with the scan tool, and can then be used to service the vehicle.

Some vehicle manufacturers also include complex electronic systems in their vehicles to access and analyze some of the above-described data. For example, General Motors includes a system called 'On-Star' in some of their high-end vehicles. On-Star collects and transmits data relating to these DTCs through a wireless network. On-Star systems are not connected through the OBD-II connector, but instead are wired directly to the vehicle's electronic system. This wiring process typically takes place when the vehicle is manufactured.

BRIEF SUMMARY OF THE INVENTION

It is an object of the present invention to provide a wireless, internet-based system for monitoring a vehicle. Specifically, it is an object of the invention to access data from a vehicle, analyze it, and make it available to organizations (e.g. an automotive dealership or service center) over the internet so that the vehicle's performance can be analyzed accurately and in real-time. The data include, for example, DTCs that trigger 'alert messages' that are emailed to a vehicle owner or displayed on a web page on the internet.

In one aspect, the invention provides a method for monitoring a vehicle that features the steps of: 1) generating a data packet that includes data retrieved from the vehicle using a wireless appliance; 2) transmitting the data packet over an airlink with the wireless appliance so that it passes through a network and to a host computer system; 3) processing the data packet with the host computer system to generate a set of data; and 4) displaying the set of data on a web page hosted on the internet.

The 'wireless appliance' used in the above-described method includes electronics that extract data from the vehicle's ECU, and a transmitting component (e.g. a radio or cellular modem) that sends out the data packet over an existing network (e.g., Cingular's Mobitex network). Such a wireless appliance is described in the U.S. patent application Ser. No. 09/776,106, now U.S. Pat. No. 6,636,790, entitled WIRELESS DIAGNOSTIC SYSTEM FOR VEHICLES, and filed Feb. 1, 2001, the contents of which are incorporated herein by reference.

In embodiments, the processing step includes extracting at least one of the following vehicle parameters from the data packet: numerical data, an alphanumeric text message, an active or pending diagnostic trouble code (e.g., a 5-digit code), or a vehicle identification number. These parameters are then processed with database software (e.g., an Oracle database) to generate a set of data that comprises an alphanumeric text message. The text message, e.g. an alert message, can be displayed on the web page or emailed to a user. The text message can also include a description of the data parameter, such as a written description of the DTC.

In related embodiments, the method includes the step of processing at least one numerical parameter from the numerical data with a mathematical algorithm. This generates an alert message from data other than DTCs. For example, the numerical parameter can be compared or displayed with at least one numerical parameter generated at an earlier point in time (e.g., a previously determined fuel level), or with a predetermined numerical value (e.g., a mileage level corresponding to a recommended service appointment). These values, or a simple analysis of the data, can be included in the alphanumeric text message displayed on the web page or sent out in an email.

In another aspect, the invention features a similar set of steps for processing data from multiple vehicles (e.g., a group of customers) associated with a corporate organization (e.g., a vehicle dealership). Specifically, the invention features the steps of 1) generating a first data packet comprising vehicle data retrieved from a first vehicle in a set of vehicles using a first wireless appliance disposed in the first vehicle; 2) transmitting the first data packet over an airlink with the first wireless appliance so that it passes through a network and to a host computer system; 3) repeating steps 1 and 2 for a second vehicle; 4) processing the first and second data packets with the host computer system to generate first and second sets of data; 5) displaying the first set of data on a first web page hosted on the internet; and 6) displaying the first and second sets of data on a second web page hosted on the internet.

In this embodiment, a single web site includes the first and second web pages. The web site also includes a 'login' web page for entering a user name and a password so that one group of users (e.g. vehicle owners) can log in with and view data from a single vehicle, while another group (e.g. corporate organizations such as vehicle dealerships, vehicle-rental organizations, insurance organizations, or fleet organizations) can log in and view data of all the users associated with the group.

In the above-described method, the term "airlink" refers to a standard wireless connection (e.g., a connection used for wireless telephones or pagers) between a transmitter and a receiver. Also in the above-described method, the 'generating' and 'transmitting' steps can be performed at any time and with any frequency, depending on the diagnoses being performed. For a 'real-time' diagnoses of a vehicle's engine performance, for example, the steps may be performed at rapid time or mileage intervals (e.g., several times each minute, or every few miles). Alternatively, other diagnoses (e.g. an emissions or 'smog' check) may require the steps to be performed only once each year or after a large number of miles are driven. Alternatively, the vehicle may be configured to automatically perform these steps at predetermined or random time intervals.

The term 'web page' refers to a single page that is hosted on the internet or world-wide web. A 'web site' typically includes multiple web pages.

The invention has many advantages. In particular, wireless transmission of data from a vehicle, followed by analysis and display of these data using a web site hosted on the internet, makes it possible to diagnose the performance of a vehicle in real-time from virtually any location that has internet access. This ultimately means the problems with the vehicle can be efficiently diagnosed, and in some cases predicted before they actually occur. Moreover, data from the vehicle can be queried and analyzed while the vehicle is actually in use to provide a relatively comprehensive diagnosis that is not possible using a conventional scan tool. An internet-based system for vehicle diagnoses can also be easily updated and made available to a large group of users simply by updating software on the web site. In contrast, a comparable updating process for a series of scan tools can only be accomplished by updating the software on each individual scan tool.

The wireless appliance used to access and transmit the vehicle's data is small, low-cost, and can be easily installed in nearly every vehicle with an OBD-II connector in a matter of minutes. It can also be easily transferred from one vehicle to another, or easily replaced if it malfunctions.

An in-vehicle wireless appliance can also collect data that is not accessible using a scan tool. For example, data that indicates a vehicles performance can be collected while the vehicle is actually driven. Scan tools, in contrast, can only collect data in a vehicle service bay. Service technicians, for example, can analyze DTCs during repair of the vehicle. The system described herein makes also makes data available in real-time, thereby allowing the technicians to order parts and schedule resources for service appointments before the vehicle is actually brought into the dealership.

The resulting data, of course, have many uses for automotive dealerships, vehicle-service organizations, vehicle-renting firms, insurance companies, vehicle owners, organizations that monitor emission performance (e.g., the EPA), manufacturers of vehicles and related parts, survey organizations (e.g., J.D. Power) and vehicle service centers. In general, these data yield information that benefits the consumer, vehicle and parts manufacturers, vehicle service centers, and the environment.

These and other advantages of the invention are described in the following detailed disclosure and in the claims.

BRIEF DESCRIPTION OF DRAWINGS

The features and advantages of the present invention can be understood by reference to the following detailed description taken with the drawings, in which.

DESCRIPTION OF THE PREFERRED EMBODIMENTS

Figure 1:
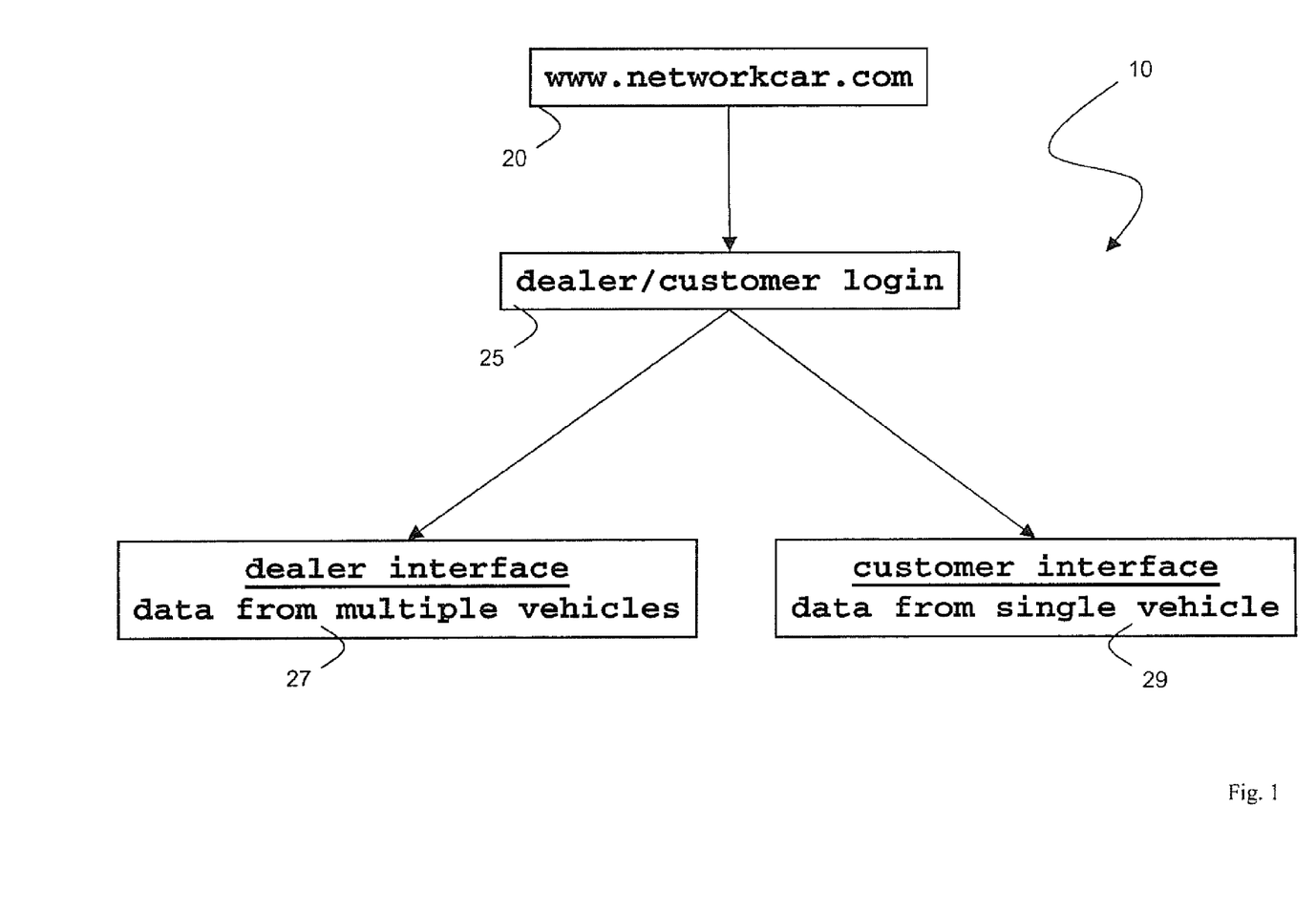
FIG. 1 is a schematic drawing of a website with a login process that renders a series of web pages associated with either a dealer interface or a customer interface.

FIG. 1 shows a schematic drawing of a login process 10 for a website 20 that displays diagnostic data for a series of 'customer' vehicles associated with a vehicle 'dealership'. Within each vehicle is a wireless appliance that retrieves data from the vehicle's engine computer, and then sends these data, formatted in a data packet, wirelessly through a network. The data eventually are transferred from the network to the website 20 where they are formatted and displayed and processed as described below.

A user 'logs' into the website 20 by entering a username and password that, once entered, are compared to a database associated with the website. The comparison determines if the user is a dealer or a customer. If the user is determined to be a dealer, the website renders a dealer interface 27 that contains, e.g., diagnostic information for each vehicle purchased from the particular dealership. Users viewing the dealer interface 27 do not have access to data corresponding to vehicles sold by other dealerships. If the user is determined to be a customer, the website 20 renders a customer interface 29 that contains diagnostic information for one or more vehicles corresponding to the customer. The customer interface contains diagnostic information for each vehicle corresponding to the customer.

Figure 2:
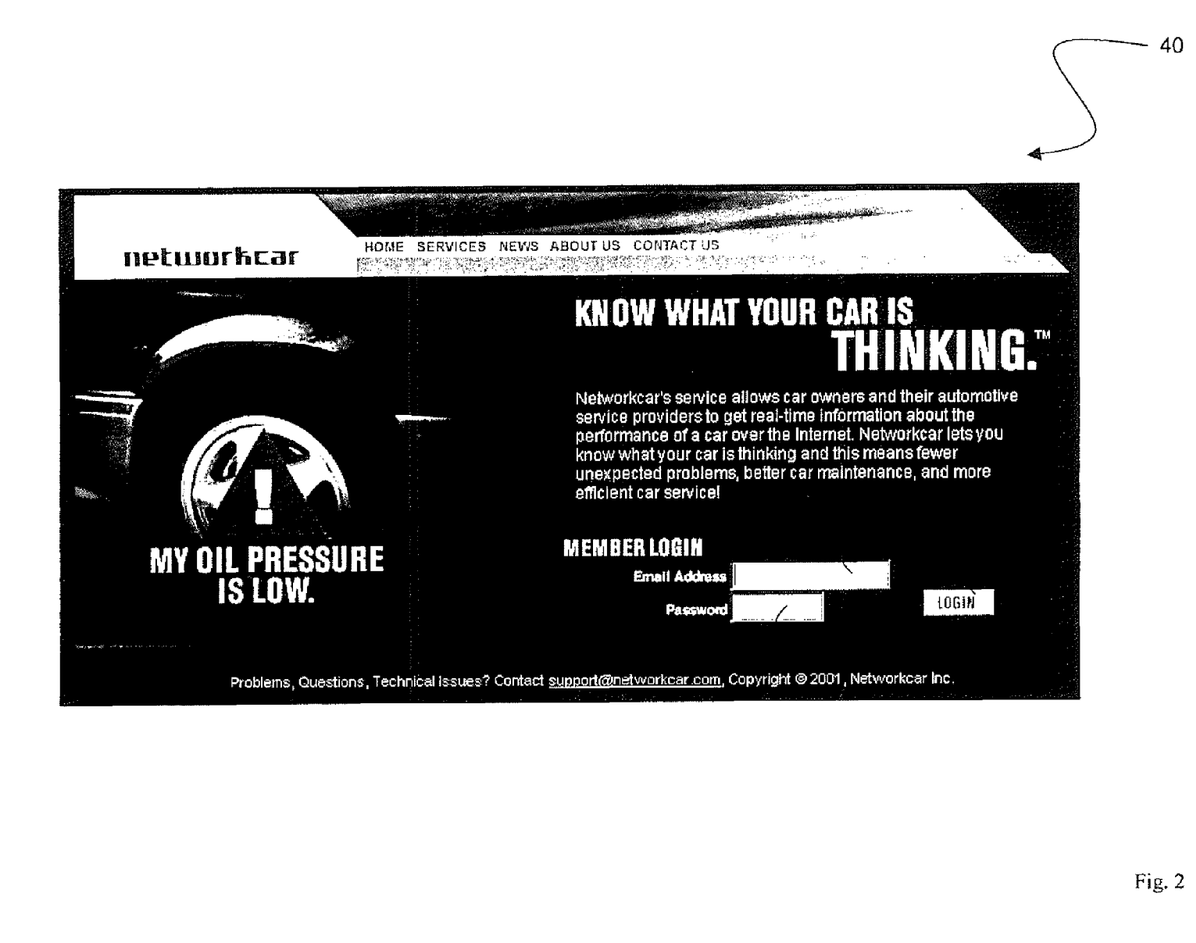
FIG. 2 is a screen capture of a web page from the web site of FIG. 1 wherein a user enters a login and password.

FIG. 2 shows a screen capture from a 'home' web page 40 of an actual website. The web page 40, corresponding to the web page 20 shown in FIG. 1 as www.networkcar.com, is accessed from a conventional web browser (e.g., Netscape Navigator). It renders a dealer/customer login portion 43 that prompts a user for a login and a password. The web page 40 includes a login region 42 where the user enters a login (in this case the user's email address), and a password region 44 where the user enters a corresponding password. The user then clicks the login button 46 to authenticate the login and log the user into the website as either a 'customer', 'dealer', or an invalid user. The authentication process is performed with conventional database software. Here and throughout the application, the term 'clicks' means a computer mouse is used to select or initiate a software-based feature on the web page.

The wireless appliance that provides a diagnostic data to the website is described in more detail in WIRELESS DIAGNOSTIC SYSTEM FOR VEHICLES, filed Feb. 1, 2001, the contents of which have been previously incorporated by reference. Each wireless appliance contains logic for retrieving data from the host vehicle and formatting the data in a data packet, and a wireless transmitter that transmits the data packet over an airlink to a wireless network (e.g., Cingular's 'Mobitex' network). Each appliance typically transmits a data packet at either a predetermined time interval (e.g., once each day), or shortly (e.g., within a few seconds) after a DTC is generated. The format of each data packet, along with the data contained therein, is described in the above-mentioned patent application. In general, each data packet contains information of its status, an address describing its destination, an address describing its origin, and a 'payload' that contains diagnostic data from the vehicle. The process for transmitting diagnostic data from a vehicle to a website is described in more detail in the above-referenced patent application.

Figure 3:
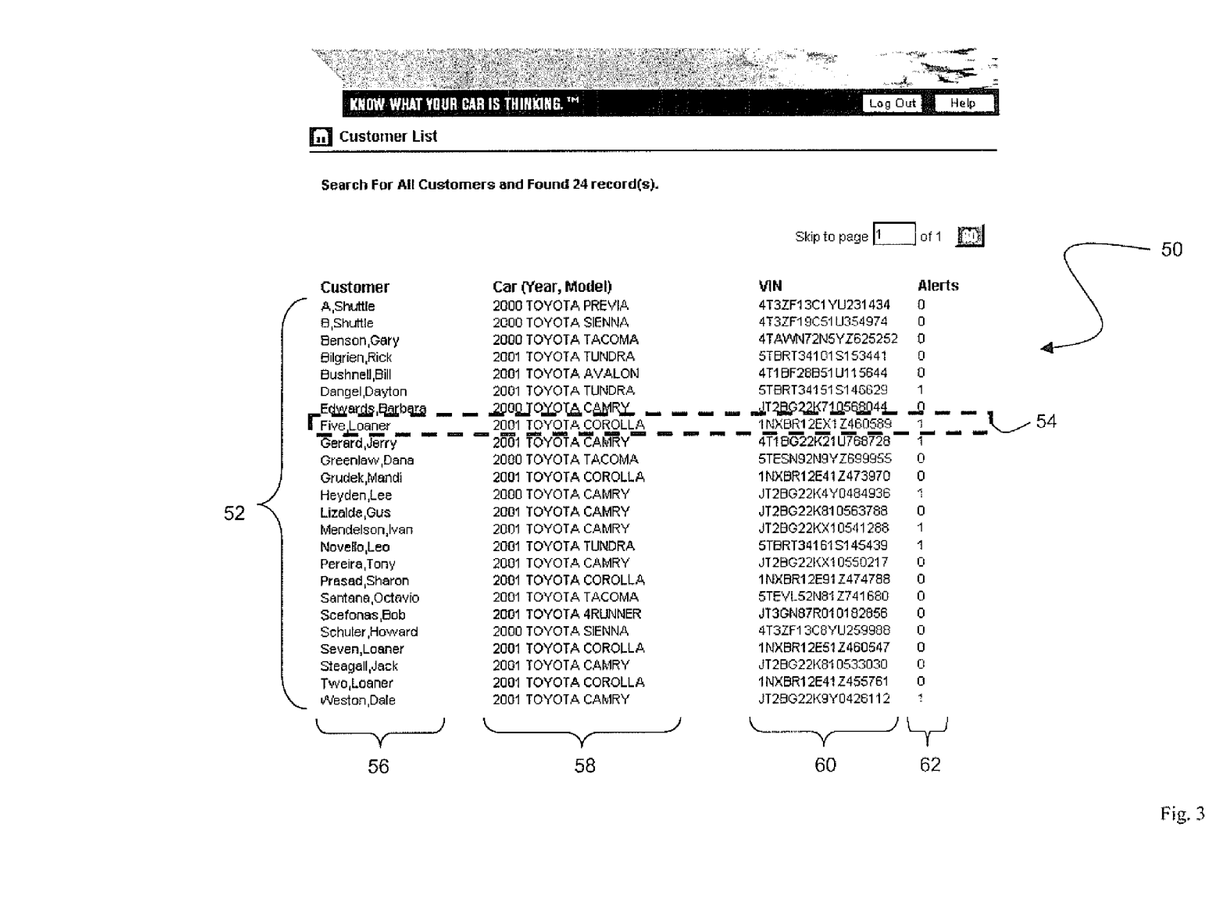
FIG. 3 is a screen capture of a web page from the web site of FIG. 1 that shows a list of customers corresponding to a single dealership.

FIG. 3 is a screen capture of a web page 50 included in the dealer interface indicated in FIG. 1. The host computer system renders this page once the user is determined to be a dealer following the login process. The screen capture features a customer list 52 corresponding to a single dealership that includes: customer names 56 for each customer; a vehicle description 58 that includes the vehicle's year, make and model; a unique 17-digit vehicle identification number ('VIN') 60 that functions as the vehicle's serial number; and an 'alert' listing 62 that provides a number of alerts, described in more detail below, for each vehicle.

An alert is generated when data, sent from the vehicle's wireless appliance to the host computer system, indicates either 1) a mechanical/electrical problem with the vehicle; or 2) that a scheduled maintenance is recommended for the vehicle. For example, the customer list 52 includes a data field 54 that lists the user 'Five, Loaner' with an associated 2001 Toyota Corolla. The data field 54 also includes the number '1' in the alert listing 62, indicating the presence of one of a single alert.

Figure 4:
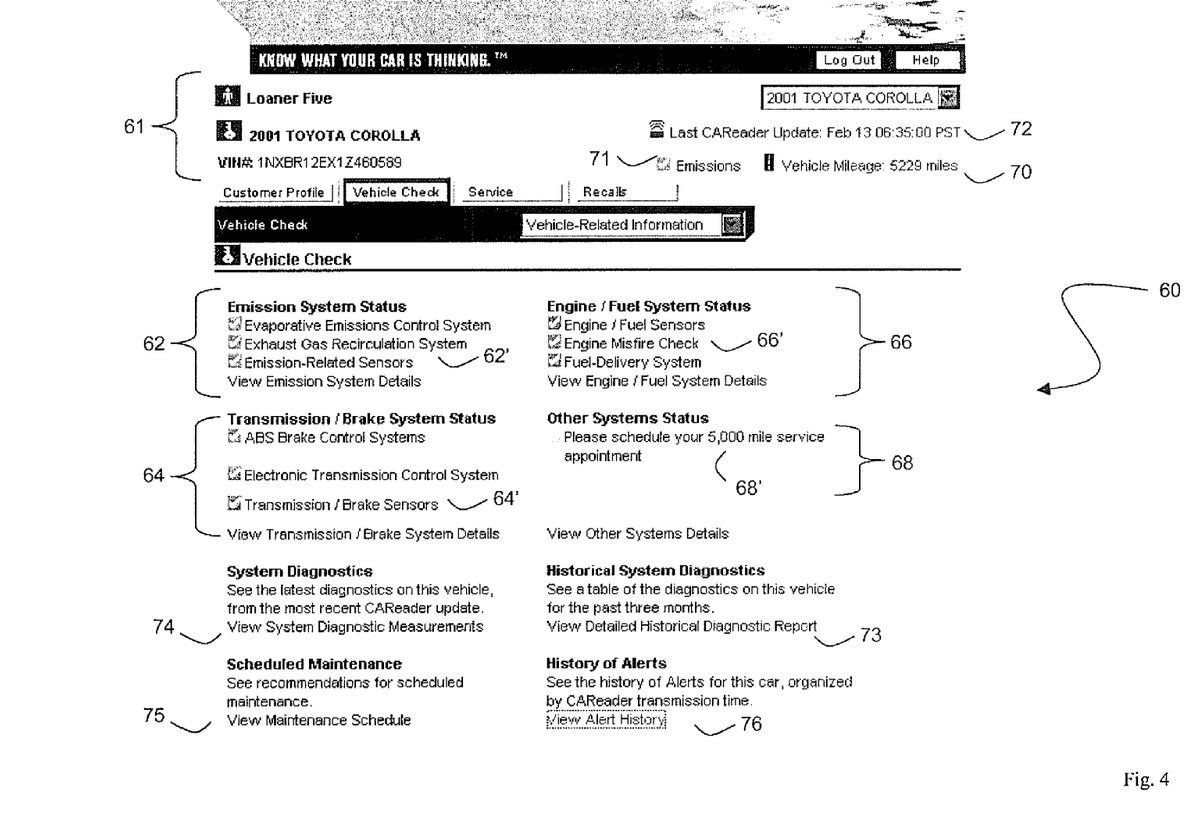
FIG. 4 is a screen capture of a web page from the web site of FIG. 1 that shows an alert message, generated by an odometer reading, for a customer's vehicle.

FIG. 4 is a screen capture of a web page 60 entitled a 'Vehicle Check Page' that describes in more detail the alert and other data for 'Five, Loaner'. The web page 60 for this user, or any other user in the customer list 52, is accessed by clicking on the highlighted name in the data field 54 shown in the web page 50 of FIG. 3. The web page 60 features a header 61 that lists general information corresponding to this particular user, e.g. name, vehicle description, and VIN. The header 61 also include diagnostic data such as a field 70 showing the vehicle's odometer reading (5229 miles), a time/date stamp 72 indicating the last time the host computer system received data from the vehicle, and an icon and data field 71 indicating the vehicle's emissions performance. In this last case, the green box with a 'checkmark' indicates that the vehicle's emissions are within the levels mandated by the EPA. It is present when the vehicle has no DTCs that are associated with its emissions system.

The web page 60 is separated into four categories describing, respectively, a status of the vehicle's 'emission' system 62, 'transmission/brakes' system 64, 'engine/fuel' system 66, and 'other' systems 68. For this vehicle, the emission 62, transmission/brakes 64, and engine/fuel 66 system categories have no associated alerts. This is indicated by, respectively, messages 62', 64', 66' preceded an icon that features a green box with a checkmark similar to that shown in the data field 71 describing the overview vehicle's emissions status. These icons indicate that no DTCs corresponding to the respective categories were detected. Conversely the 'other' system category 68 includes an alert message 68' that includes a text message field preceded by an icon that features a yellow box with a 'question mark'. The presence of this single alert message 68' is what generates the '1' listed in the data field 54 in FIG. 3. The alert message 68' is generated in response to an odometer reading (i.e., 5229 miles) transmitted in the most recent data packet sent by the vehicle.

The alert message 68' is first generated when the vehicle's mileage is within 1000 miles of the mileage corresponding to a recommended scheduled maintenance, which in this case is 5000 miles. Thus, an alert in generated and first appears on the web page 60 when the vehicle's odometer reading is 4000 miles or greater. Mileage values corresponding to this and other recommended schedule maintenances are entered into the system in a 'Scheduled Maintenance' section 75 on the same page. The alert message 68' appears on the web page 60 until: 1) the recommended service is performed on the vehicle; or 2) the vehicle's mileage is greater than 1000 miles from the mileage corresponding to a recommended scheduled maintenance (i.e., 6000 miles). In either case, the alert is 'cleared' from the web page 60 and is stored in a 'History of Alert' section 75 that, when clicked, historically lists all the cleared alerts corresponding to this particular vehicle.

Figures 5A, 5B:
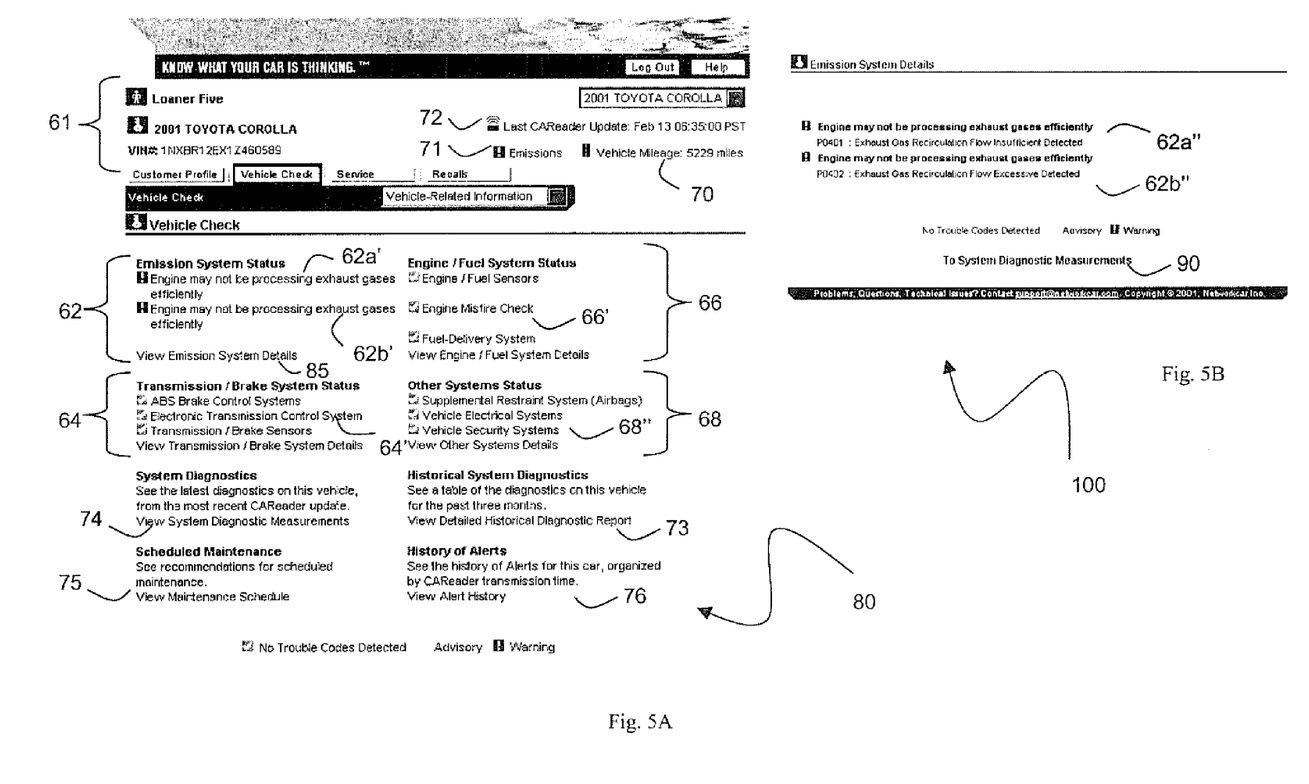
FIG. 5A is a screen capture of a web page from the web site of FIG. 1 that shows two alerts, each generated by a separate DTC, for a customer's vehicle.
FIG. 5B is a screen capture of a web page associated with the web page of FIG. 5A that shows two 5-digit DTCs corresponding to the two alert messages shown in FIG. 5A.

FIGS. 5A and 5B show, respectively, screen captures of web pages 80 and 100 that indicate alert messages 62a', 62b' triggered by the presence of separate emissions-related DTCs within the vehicle. The DTC is sent from the vehicle in the data packet described above. The web pages 80, 100 feature the same general format as shown for FIG. 4, i.e. four categories describing the vehicle's 'emission' system 62, 'transmission/brakes' system 64, 'engine/fuel' system 66, and 'other' systems 68. In this case, the transmission/brakes 64, engine/fuel 66 and other 68 systems have no associated alerts, and thus include messages 64', 66', and 68' preceded an icon that features a green box with a 'checkmark' as before. In contrast, the emissions system 62 includes two alert messages 62a', 62b'. Each message includes a brief text message: 'engine may not be processing exhaust gasses efficiently'. The text message is included in a database and associated with each of the 5-digit DTCs. Note that the presence of the alert messages 62a', 62b' means that there is a problem with this vehicle's emission system, and thus the icon in the data field 71 in the page's header 61 is red with an exclamation point.

Figure 6:
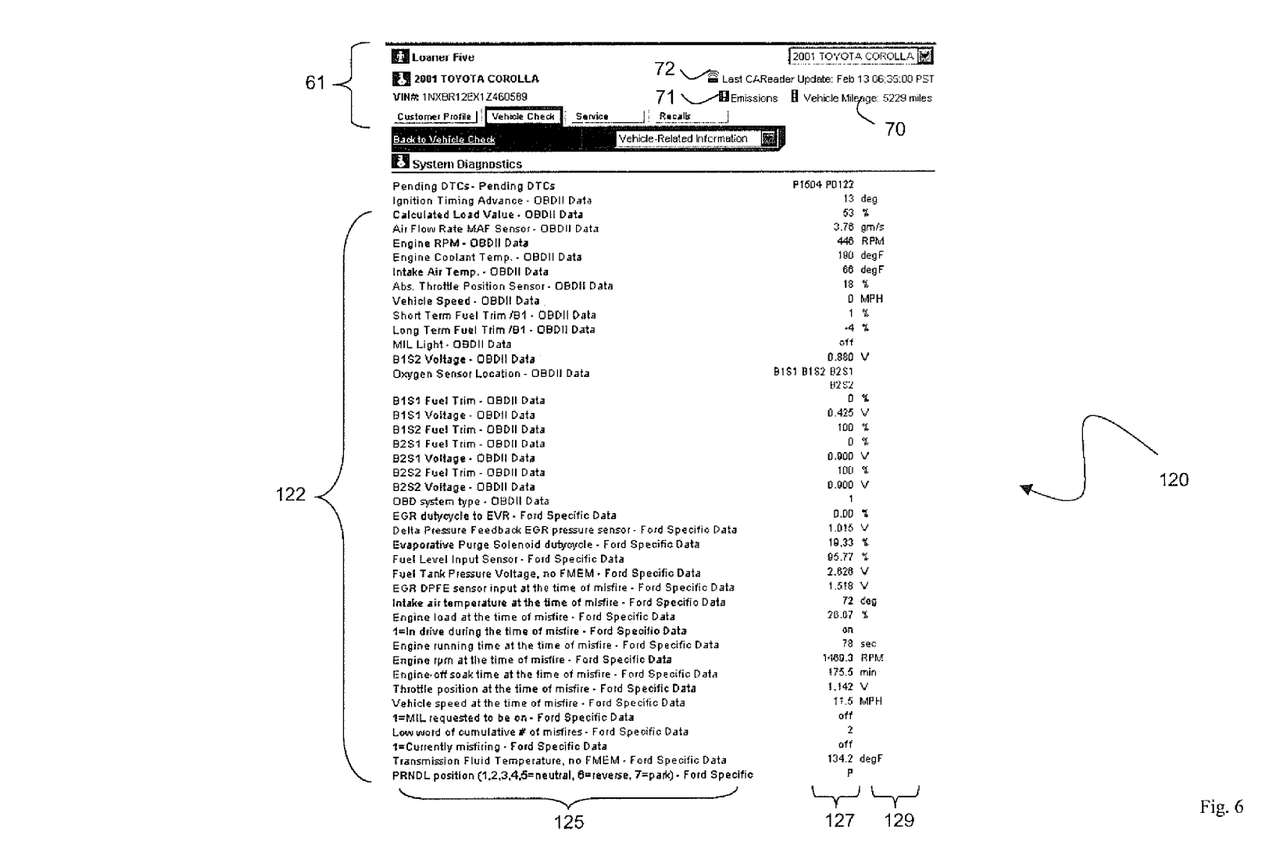
FIG. 6 is a screen capture of a web page from the web site of FIG. 1 that shows recent diagnostic data for a customer's vehicle.

FIG. 5B shows a screen capture of a web page 100 that includes more details for the alert messages 62a', 62b' from FIG. 5A. The web page 100 renders when a user clicks on the 'View Emissions System Details' link 85 in the emissions category 62 and includes alert messages 62a", 62b". These messages are essentially more detailed versions of the alert messages 62a', 62b' shown in FIG. 5A. They include the same text description as alert messages 62a', 62b' in addition to a more detailed text description ("Exhaust Gas Recirculation Flow Insufficient Detected" for alert message 62a"'; "Exhaust Gas Recirculation Flow Excessive Detected" for alert message 62b'''') and the 5-digit DTC (P0401 for alert message 62a''; P0402 for alert message 62b''). Detailed diagnostic data corresponding to the DTCs is accessed by clicking on the 'To System Diagnostic Measurements' field 90 in FIG. 5B. As shown in FIG. 6, this field 90 renders a web page 120 that lists a detailed data set 122 transmitted from the vehicle-based wireless appliance to the host computer system. The host computer system receives the data set 122 at a time described by a time/date stamp 72 listed in the header 61. The data set 122 includes a data parameter name 125, a corresponding numerical value 127, and a description of the units 129 of the numerical value 127. Some of the numerical values (e.g., the status of the 'MIL light' 131) are dimensionless, i.e. they do not have units. As described above, to generate the numerical values 127 the wireless appliance queries the vehicle's ECU at a set time interval (e.g. every 20 seconds), and transmits a data set 122 at a longer time interval (e.g. every 10 minutes). Thus, the numerical values in the data set can represent 'instantaneous' values that result from a single query to the ECU, or they can represent 'average' values that result from an average from multiple sequential queries.

The data parameters within the set 122 describe a variety of electrical, mechanical, and emissions-related functions in the vehicle. Several of the more significant parameters from the set are listed in Table 1, below:

TABLE 1

Parameters Monitored from Vehicle

Pending DTCs
Ignition Timing Advance
Calculated Load Value
Air Flow Rate MAF Sensor
Engine RPM
Engine Coolant Temperature
Intake Air Temperature
Absolute Throttle Position Sensor
Vehicle Speed
Short-Term Fuel Trim
Long-Term Fuel Trim
MIL Light Status
Oxygen Sensor Voltage
Oxygen Sensor Location
Delta Pressure Feedback EGR Pressure Sensor
Evaporative Purge Solenoid Dutycycle
Fuel Level Input Sensor
Fuel Tank Pressure Voltage
Engine Load at the Time of Misfire
Engine RPM at the Time of Misfire
Throttle Position at the Time of Misfire
Vehicle Speed at the Time of Misfire
Number of Misfires
Transmission Fluid Temperature
PRNDL position (1, 2, 3, 4, 5 = neutral, 6 = reverse)
Number of Completed OBDII Trips
Battery Voltage The parameters listed in Table 1 were measured from a Ford Crown Victoria. Similar sets of data are available for nearly all vehicles manufactured after 1996. In addition to these, hundreds of other vehicle-specific parameters are also available from the vehicle's ECU.

The data set 122 shown in FIG. 6 represents a current data sent from the vehicle's wireless appliance to the host computer system. Data sets sent at earlier times can also be analyzed individually or in a group to determine the vehicle's performance. These 'historical data', for example, can by used to determine trends in the vehicle's performance. In some cases data analyzed in this manner can be used to predict potential problems with the vehicle before they actually occur.

Figure 7:
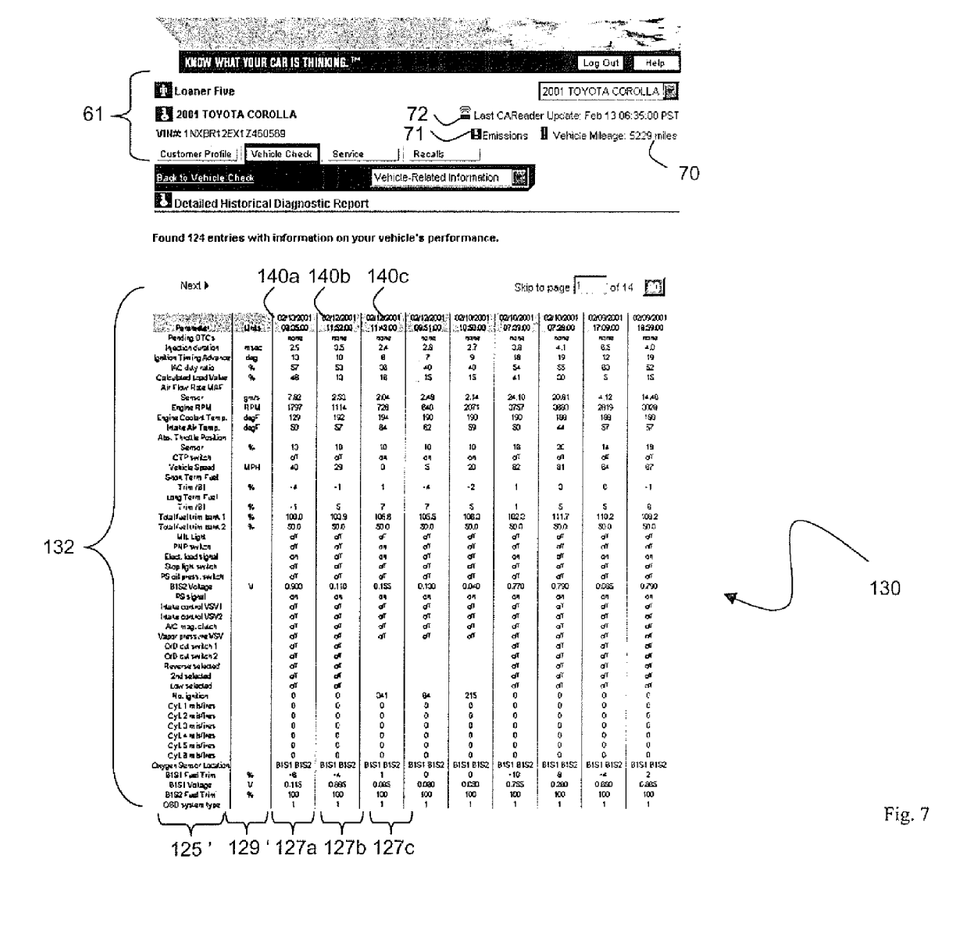
FIG. 7 is a screen capture of a web page from the website of FIG. 1 that shows several time-dependent sets of diagnostic data for a customer's vehicle.

Referring to FIG. 7, a web page 130 includes a historical data set 132 containing data parameter names 125', units 129' and a series of data sets 127a-127c transmitted at earlier times from the in-vehicle wireless appliance. Each of these data sets is similar to the data set 122 shown in FIG. 6, but is received by the host computer system at an earlier time indicated by a timestamps 140a-140c. For example, the first two data sets 127c, 127b where transmitted with time stamps 140b, 140c of 11:42 and 11:52 on Feb. 12, 2001; the last data set 127a was transmitted the next morning with a time stamp 140a of 6:05. Time-dependent data shown in this manner can be analyzed to determine trends in a vehicle's performance. The trends can then be used to diagnose or predict a problem with the vehicle.

Other embodiments are also within the scope of the invention. In particular, the web pages used to display the data can take many different forms, as can the manner in which the data are displayed. Web pages are typically written in a computer language such as 'HTML' (hypertext mark-up language), and may also contain computer code written in languages such as Java for performing certain functions (e.g., sorting of names). The web pages are also associated with database software (provided by companies such as Oracle) that is used to store and access data. Equivalent versions of these computer languages and software can also be used.

Different web pages may be designed and accessed depending on the end-user. As described above, individual users have access to web pages that only show data for their particular vehicle, while organizations that support a large number of vehicles (e.g. dealerships or distributors) have access to web pages that contain data from a collection of vehicles. These data, for example, can be sorted and analyzed depending on vehicle make, model, odometer reading, and geographic location. The graphical content and functionality of the web pages may vary substantially from what shown in the above-described figures. In addition, web pages may also be formatted using standard wireless access protocols (WAP) so that they can be accessed using wireless devices such as cellular telephones, personal digital assistants (PDAs), and related devices.

The web pages also support a wide range of algorithms that can be used to analyze data once it is extracted from the data packets. For example, the above-mentioned method alert messages are sent out in response to a DTC or when a vehicle approaches a pre-specified odometer reading. Alternatively, the message could be sent out when a data parameter (e.g. engine coolant temperature) exceeded a predetermined value. In some case, multiple parameters (e.g., engine speed and load) can be analyzed to generate an alert message. In general, an alert message can be sent out after analyzing one or more data parameters using any type of algorithm. These algorithms range from the relatively simple (e.g., determining mileage values for each vehicle in a fleet) to the complex (e.g., predictive engine diagnoses using 'data mining' techniques). Data analysis may be used to characterize an individual vehicle as described above, or a collection of vehicles, and can be used with a single data set or a collection of historical data. Algorithms used to characterize a collection of vehicles can be used, for example, for remote vehicle or parts surveys, to characterize emission performance in specific geographic locations, or to characterize traffic.

Other embodiments of the invention include algorithms for analyzing data to characterize vehicle accidents and driving patterns for insurance purposes; algorithms for determining driving patterns for use-based leasing; and algorithms for recording vehicle use and driving patterns for tax purposes. In general, any algorithm that processes data collected with the above-described method is within the scope of the invention.

Similarly, the temporal or mileage frequency at which data is collected can be adjusted to diagnose specific types of problems. For example, characterization of certain types of vehicle performance indicators, such as emissions, may need to be monitored relatively frequently (e.g., once every few minutes). Other properties, such as mileage and fluid levels, may only need to be monitored every few days, or in some cases just a few times each year.

In other embodiments, additional hardware can be added to the in-vehicle wireless appliance to increase the number of parameters in the transmitted data. For example, hardware for global-positioning systems (GPS) may be added so that the location of the vehicle can be monitored along with its data. Or the radio modem used to transmit the data may employ a terrestrial GPS system, such as that available on modems designed by Qualcomm, Inc. In still other embodiments, the location of the base station that transmits the message can be analyzed to determine the vehicle's approximate location. In addition, the wireless appliance may be interfaced to other sensors deployed in the vehicle to monitor additional data. For example, sensors for measuring tire pressure and temperature may be deployed in the vehicle and interfaced to the appliance so that data relating the tires' performance can be transmitted to the host computer system.

In other embodiments, data processed using the above-described systems can be used for: remote billing/payment of tolls; remote smog and emissions checks; remote payment of parking/valet services; remote control of the vehicle (e.g., in response to theft or traffic/registration violations); and general survey information.

Still other embodiments are within the scope of the following claims.

What is claimed is:

1. A method for monitoring a vehicle with a vehicle computer device located in the vehicle, comprising:
   (a) acquiring vehicle data comprising numerical diagnostic data or location-based data associated with the vehicle;
   (b) processing the vehicle data according to a mathematical algorithm to generate derived diagnostic or location information that is at least in part derived from the acquired vehicle data, and wherein the derived information has a meaning distinct from the acquired vehicle data;
   (c) formatting the derived diagnostic or location information for display on an application running on a host computer device, wherein the application can provide an interface for presenting information associated with the vehicle, wherein the interface includes at least one of an icon and a data field associated with derived information indicative of the vehicle's emissions performance, and
   (d) wirelessly transmitting the derived information in a communication to the host computer device.

2. The method of claim 1, wherein the application includes a browser.

3. The method of claim 1, wherein the processing further includes extracting information representative of at least one of the following vehicle parameters from the received data: numerical data, an alphanumeric text message, and a vehicle identification number.

4. The method of claim 1, wherein the numerical diagnostic data includes at least one of the following numerical parameters: diagnostic trouble codes, vehicle speed, fuel level, fuel pressure, miles per gallon, engine RPM, mileage, oil pressure, oil temperature, tire pressure, tire temperature, engine coolant temperature, intake-manifold pressure, engine performance tuning parameters, alarm status, accelerometer status, cruise-control status, fuel injector performance, spark-plug timing, and a status of an anti-lock braking system.

5. The method of claim 1, wherein the host computer device is one of a cellular telephone, a personal digital assistant (PDA), a wireless smartphone, or a personal computer.

6. A vehicle computer device, located in a vehicle, configured to perform a method, the method comprising:
   (a) acquiring vehicle data comprising numerical diagnostic data or location-based data associated with the vehicle;
   (b) processing the vehicle data according to a mathematical algorithm to generate derived diagnostic or location information that is at least in part derived from the acquired vehicle data, and wherein the derived information has a meaning distinct from the acquired vehicle data;
   (c) formatting the derived diagnostic or location information for display on an application running on a host computer device, wherein the application can provide an interface for presenting information associated with the vehicle, wherein the interface includes at least one of an icon and a data field associated with derived information indicative of the vehicle's emissions performance, and
   (d) wirelessly transmitting the derived information in a communication to the host computer device.

7. The method of claim 6, wherein the application includes a browser.

8. The method of claim 6, wherein the processing further includes extracting information representative of at least one of the following vehicle parameters from the received data: numerical data, an alphanumeric text message, and a vehicle identification number.

9. The method of claim 6, wherein the numerical diagnostic data includes at least one of the following numerical parameters: diagnostic trouble codes, vehicle speed, fuel level, fuel pressure, miles per gallon, engine RPM, mileage, oil pressure, oil temperature, tire pressure, tire temperature, engine coolant temperature, intake-manifold pressure, engine performance tuning parameters, alarm status, accelerometer status, cruise-control status, fuel injector performance, spark-plug timing, and a status of an anti-lock braking system.

10. The method of claim 6, wherein the host computer device is one of a cellular telephone, a personal digital assistant (PDA), a wireless smartphone, or a personal computer.

11. A graphical user interface running on a host computer device for displaying derived diagnostic or location information corresponding to a vehicle wherein the derived diagnostic or location information displayed by the graphical user interface includes diagnostic or location information wirelessly transmitted by, a vehicle computer device coupled to the vehicle to acquire diagnostic and location vehicle data generated thereby, and wherein the vehicle computer device processes the diagnostic or location vehicle data according to a mathematical algorithm, and wherein the information comprises at least one of vehicle status reports and vehicle service recommendations to generate the derived information so that it has a meaning distinct from the acquired diagnostic and location vehicle data,
   wherein the graphical user interface includes at least one of an icon and data field associated with derived information indicative of the vehicle's emissions.

12. The graphical user interface of claim 11 wherein the displayed graphical user interface includes a web browser.

13. The graphical user interface of claim 11, wherein the graphical user interface is configured for displaying information formatted according to at least one wireless access protocol (WAP).

14. The graphical user interface of claim 11, wherein the host computer device is one of a cellular telephone, a personal digital assistant (PDA), a wireless smartphone, or a personal computer.

* * * * *